(12) United States Patent
Gans

(10) Patent No.: US 8,677,599 B2
(45) Date of Patent: Mar. 25, 2014

(54) BLADE CONSTRUCTS AND METHODS OF FORMING BLADE CONSTRUCTS

(75) Inventor: Adam Gans, Prevost (CA)

(73) Assignee: Bauer Hockey, Inc., Exeter, NH (US)

( * ) Notice: Subject to any disclaimer, the term of this patent is extended or adjusted under 35 U.S.C. 154(b) by 87 days.

(21) Appl. No.: 12/886,147

(22) Filed: Sep. 20, 2010

(65) Prior Publication Data

US 2012/0070301 A1 Mar. 22, 2012

(51) Int. Cl.
| B21B 1/46 | (2006.01) |
|---|---|
| B21B 13/22 | (2006.01) |
| B22D 11/126 | (2006.01) |
| B22D 11/128 | (2006.01) |
| B23P 17/00 | (2006.01) |
| B23P 25/00 | (2006.01) |

(52) U.S. Cl.
USPC .................. 29/527.1; 29/419.1; 473/563

(58) Field of Classification Search
USPC ............. 29/419.1, 527.1; 473/561, 563; 264/510, 544
See application file for complete search history.

(56) References Cited

U.S. PATENT DOCUMENTS

| 3,934,875 A | 1/1976 | Easton | |
|---|---|---|---|
| 4,025,686 A | 5/1977 | Zion | |
| 4,059,269 A * | 11/1977 | Tiitola | 473/561 |
| 4,061,520 A | 12/1977 | Cecka | |
| 4,084,818 A * | 4/1978 | Goupil et al. | 473/561 |
| 4,312,912 A | 1/1982 | Tamura | |
| 4,591,155 A | 5/1986 | Adachi | |
| 4,939,020 A | 7/1990 | Takahima et al. | |
| 5,050,878 A * | 9/1991 | Deleris | 473/561 |
| 5,078,396 A | 1/1992 | Cavallaro | |
| 5,152,856 A | 10/1992 | Thein | |
| 5,160,135 A * | 11/1992 | Hasegawa | 473/561 |
| 5,174,934 A | 12/1992 | Saatchi | |
| 5,188,872 A | 2/1993 | Quigley | |
| 5,217,221 A | 6/1993 | Baum | |

(Continued)

FOREIGN PATENT DOCUMENTS

| CA | 2365484 | 6/2003 |
|---|---|---|
| FR | 2638368 | 5/1990 |

(Continued)

OTHER PUBLICATIONS

European Office Action dated Jun. 10, 2010 for Application No. 08252256.6-1253, 4 pages.

(Continued)

Primary Examiner — David Bryant
Assistant Examiner — Christopher M Koehler
(74) Attorney, Agent, or Firm — Banner & Witcoff, Ltd.

(57) ABSTRACT

A dual-core blade and method for manufacturing a dual-core blade are disclosed. The blade is formed with a first core portion and a second core portion comprising an epoxy having a plurality of expanded microspheres. The method of forming the two foams generally comprises sizing a foam core to form a first core portion and providing and preparing an epoxy mixture to form a second core portion. The first core portion and the second core portion of the epoxy mixture are placed into a preform, and the preform is heated slightly so as to cause the epoxy mixture to flow into the shape of the preform and around the first core portion. The first core portion and the second core portion are then bonded in a molding operation. The formed structure can form part of a hockey stick blade.

18 Claims, 6 Drawing Sheets

(56) References Cited

U.S. PATENT DOCUMENTS

| | | |
|---|---|---|
| 5,230,947 A | 7/1993 | Ou |
| 5,242,637 A | 9/1993 | Inoue et al. |
| 5,333,857 A | 8/1994 | Lallemand |
| 5,407,195 A | 4/1995 | Titola |
| 5,496,027 A | 3/1996 | Christian |
| 5,587,231 A | 12/1996 | Mereer |
| 5,672,120 A | 9/1997 | Ramirez |
| 5,741,574 A | 4/1998 | Boyce |
| 5,888,329 A | 3/1999 | Cho |
| 6,062,996 A * | 5/2000 | Quigley et al. ............... 473/563 |
| 6,355,339 B1 | 3/2002 | Sherwood |
| 6,573,309 B1 | 6/2003 | Reitenbach et al. |
| 6,864,297 B2 | 3/2005 | Nutt et al. |
| 6,918,847 B2 * | 7/2005 | Gans et al. .................... 473/563 |
| 7,008,338 B2 | 3/2006 | Pearson |
| 7,044,870 B2 | 5/2006 | Pagotto |
| 7,097,577 B2 | 8/2006 | Goldsmith |
| 7,125,352 B2 | 10/2006 | Gagnon |
| 7,144,343 B2 | 12/2006 | Goldsmith |
| 7,232,386 B2 | 6/2007 | Halko |
| 7,261,787 B2 | 8/2007 | Bellefleur |
| 7,326,136 B2 | 2/2008 | Jean |
| 7,329,195 B2 | 2/2008 | Pearson |
| 7,824,591 B2 | 11/2010 | Gans |
| 2002/0025423 A1 | 2/2002 | Dreher |
| 2003/0004019 A1* | 1/2003 | Lussier et al. ................ 473/563 |
| 2003/0104883 A1* | 6/2003 | Caron ............................ 473/560 |
| 2003/0119612 A1 | 6/2003 | Goldsmith |
| 2003/0153415 A1* | 8/2003 | Gagnon et al. ................ 473/561 |
| 2004/0041128 A1 | 3/2004 | Carter |
| 2004/0043181 A1 | 3/2004 | Sherwood |
| 2004/0150130 A1 | 8/2004 | Cundiff |
| 2004/0235592 A1 | 11/2004 | McGrath |
| 2005/0074593 A1 | 4/2005 | Day |
| 2005/0090339 A1* | 4/2005 | Gans et al. .................... 473/561 |
| 2005/0156358 A1* | 7/2005 | Bellefleur et al. ............ 264/510 |
| 2005/0176530 A1 | 8/2005 | Sartor |
| 2005/0236736 A1 | 10/2005 | Formella |
| 2006/0089215 A1* | 4/2006 | Jean et al. ..................... 473/560 |
| 2006/0090838 A1* | 5/2006 | Bellefleur et al. ............ 156/185 |
| 2006/0142100 A1 | 6/2006 | Pearson |
| 2006/0269738 A1 | 11/2006 | Kimberly |
| 2006/0281592 A1 | 12/2006 | Goldsmith |
| 2007/0249437 A1* | 10/2007 | Halko et al. .................. 473/561 |
| 2007/0281810 A1 | 12/2007 | Garcia |
| 2008/0093765 A1* | 4/2008 | Sartor et al. .................. 264/103 |
| 2009/0093326 A1* | 4/2009 | Goldsmith et al. ........... 473/561 |
| 2009/0149283 A1* | 6/2009 | Garcia ........................... 473/563 |
| 2009/0149284 A1* | 6/2009 | Garcia ........................... 473/563 |
| 2009/0203476 A1* | 8/2009 | Goldsmith et al. ........... 473/561 |
| 2009/0233053 A1* | 9/2009 | Gans et al. .................... 428/192 |
| 2009/0233741 A1* | 9/2009 | Gans ............................. 473/563 |
| 2009/0280933 A1 | 11/2009 | Gans |
| 2010/0319835 A1 | 12/2010 | Gans |
| 2011/0036489 A1* | 2/2011 | Goldsmith et al. ........... 156/185 |

FOREIGN PATENT DOCUMENTS

| | | |
|---|---|---|
| GB | 2075412 | 11/1983 |
| GB | 2259667 | 3/1993 |
| GB | 2262315 | 6/1993 |

OTHER PUBLICATIONS

U.S. Office Action dated Mar. 23, 2010 for U.S. Appl. No. 12/469,349, 20 pages.

European Search Report dated Aug. 12, 2009 for Application No. 08252256.6-1253, 8 pages.

European Office Action dated Feb. 26, 2010 for Application No. 08252256.6-1253, 4 pages.

Office Action dated Mar. 31, 2009 for U.S. Appl. No. 12/048,976, 6 pages.

Office Action dated Jul. 7, 2009 for U.S. Appl. No. 12/048,976, 11 pages.

Office Action dated Mar. 16, 2010 for U.S. Appl. No. 12/048,976, 18 pages.

Notice of Allowance dated Jun. 2, 2010 for U.S. Appl. No. 12/048,976, 8 pages.

Office Action dated Sep. 27, 2010 for U.S. Appl. No. 12/469,349, 12 pages.

European Search Report dated Sep. 23, 2009 for Application No. EP08252257.4 8 pages.

Extended European Search Report Dated Mar. 10, 2011 for Application No. EP10252086.3 5 pages.

Office Action dated Mar. 9, 2011 for U.S. Appl. No. 12/048,941, 47 pages.

Expancel Microspheres, "Product Specification Expancel Du Dry Unexpanded Microspheres", Jun. 2007, <retrieved from http://www.expancel.com/ on Mar. 13, 2008>.

Ahmad, Maf, "Flexible Vinyul Resiliency Property Enhancement With Hollow Termoplastic Microspheres", Journal of Vinyl & Additive Technology, Sep. 2001, vol. 7, No. 3.

Webpages retrieved from http://www.expancel.com/. (Retrieved Mar. 13, 2008).

European Search Report for Application No. EP10013732.2-1253, dated Jan. 11, 2011, 7 pages.

* cited by examiner

BLADE CONSTRUCTS AND METHODS OF FORMING BLADE CONSTRUCTS

FIELD OF INVENTION

This invention relates generally to fabrication of molded structures. More particularly, aspects of this invention relate to hockey blades formed from more than one foam core. The cores can include a foam core and a core formed from an epoxy having expandable thermoplastic microspheres. Types of foam cores that can be used in conjunction with the various aspects disclosed herein are disclosed in U.S. patent application Ser. Nos. 12/048,941, 12/048,976, and 12/469,349, which are all incorporated herein fully by reference.

BACKGROUND

Typical hockey stick blades are generally made of a core reinforced with one or more layers of synthetic materials such as fiberglass, carbon fiber or Aramid. The core of the blade may also be made of a synthetic material reinforced with layers of fibers. The layers may be made of a woven filament fiber, preimpregnated with resin. These structures may include a foam core with a piece of fiber on the front face of the blade and a second piece of fiber on the rear face of the blade, in the manner of pieces of bread in a sandwich.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to systems and methods for fabricating a formed dual-core structure.

In one aspect of the invention, a method for forming a dual-core blade comprises sizing a foam core to form a first core portion and providing an epoxy mixture to form a second core portion. The first core portion and the second core portion are placed into a preform, and the preform is heated so as to cause the epoxy mixture to flow into the shape of the preform and around the first core portion. The first core portion and the second core portion are then wrapped with fiber tape to create a wrapped preform. The first core portion is stitched with a thread, and the thread extends between a first wrapped face and a second wrapped face of the wrapped preform. The wrapped preform is placed in a mold and heated to bond the first core portion and the second core portion. The mold is then cooled and the formed structure is removed from the mold.

In another aspect of the invention, the first core portion is curved prior to placing the first core portion into the preform.

In another aspect of the invention, the first core portion and the second core portion are wrapped with a layer carbon fiber. The layer of carbon fiber comprises a first sheet and a second sheet, and the first core portion and the second core portion are placed on the first sheet. The first sheet is wrapped around portions of the first core portion and the second core portion, and the second sheet is placed over the first core portion and the second core portion prior to placing the first core portion and the second core portion into the preform.

In another aspect of the invention, the second core portion mixture can comprise a plurality of expanded and partially expanded microspheres, and once the mold is heated, the partially expanded microspheres fully expand. Alternatively, the second core portion mixture can comprise a plurality of expanded and unexpanded microspheres, and once the mold is heated, the unexpanded microspheres fully expand.

In another aspect of the invention, after wrapping the foam core with a layer of fiber tape, a non-tacky veil is placed on at least a portion of the first core portion.

In another aspect of the invention, a blade comprises a first core portion formed of foam and a second core portion comprising an epoxy having a plurality of expanded microspheres. The first core portion and the second core portion form a core comprising a first core face and a second core face. A layer of carbon fiber is wrapped around the core and a layer of resin preimpregnated tape is wrapped continuously around at least the first core face and the second core face. A thread is stitched on the preimpregnated tape on the first core portion.

In another aspect of the invention, the first core portion and the second core portion are bonded to form a continuous core. In particular, the first core portion has a bottom surface which is bonded to a top surface of the second core portion by cross-linking the epoxy.

In another aspect of the invention, a non adhesive scrim is applied to the portions of the resin preimpregnated tape that extend along the first core portion.

In another aspect of the invention, the core forms part of a hockey blade comprising a toe region and a heel. The first core portion can have an oval-shaped end, and the second core portion can also have an oval-shaped end. Additionally, an end of the first core portion or the second core portion can have a hook shape to accommodate a correspondingly shaped oval-shaped end. The first core portion can extend from the heel of the blade to the toe region of the blade, and the second core portion can extend from the toe region of the blade to the heel of the blade. The first core portion can be formed thickest at the heel portion of the blade and taper from the heel of the blade to the toe region of the blade. The second core portion can be formed thickest at the toe region of the blade and taper from the toe region of the blade to the heel of the blade. Additionally, the first core can be of a lower density than second core portion.

Other objects and features of the invention will become apparent by reference to the following description and drawings.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

The reader is advised that the attached drawings are not necessarily drawn to scale.

In the following description of various example structures in accordance with the invention, reference is made to the accompanying drawings, which form a part hereof, and in which are shown by way of illustration of various structures in accordance with the invention. Additionally, it is to be understood that other specific arrangements of parts and structures may be utilized, and structural and functional modifications may be made without departing from the scope of the present invention. Also, while the terms "top" and "bottom" and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

In general, as described above, aspects of this invention relate to systems and methods for fabricating a structure, such as a hockey stick blade. More detailed descriptions of aspects of this invention follow.

Figure 1:
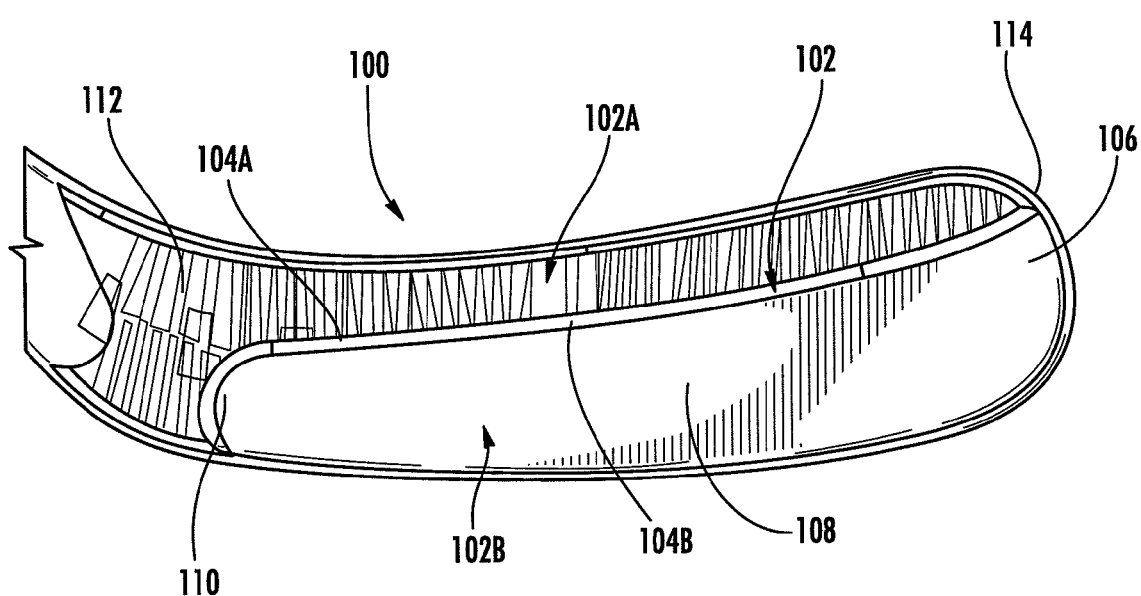
FIG. 1 generally illustrates an isometric side view of a core formed in the shape of a blade.

As shown in FIG. 1, a hockey blade 100 is shown having a toe region 106, a middle region 108 and a heel 110. A core 102 of the hockey blade 100 can be formed of a first lower density foam core portion 102A and a second higher density foam core portion 102B. The first core portion 102A can be stitched using a thread 112 (shown in FIG. 2). The second core portion 102B can be formed of an epoxy having a plurality of polymeric shell microspheres. The first core portion 102A and the second core portion 102B are bonded to form the continuous core 102. In particular, the first core portion 102A has a bottom surface 104A which is bonded to a top surface 104B of the second core portion 102B during a molding and cross-linking process.

The first core portion 102A extends from the heel 110 of the blade to the toe region 106 of the blade. The first core portion 102A can be formed thickest at the heel 110 of the blade and can taper from the heel 110 of the blade to the toe region 106 of the blade. Forming the first core portion 102A thickest or widest in the heel 110 compensates for the loss of stiffness due to the lower density and lower modulus of the foam. The second core portion 102B extends from the toe region 106 of the blade to the heel 110 of the blade 100. The second core portion can be thickest at the toe region 106 of the blade 100 and can taper from the toe region 106 of the blade 100 to the heel 110 of the blade 100. Both the first core portion 102A and the second core portion 102B can extend all the way to the toe edge 114 of the blade 100. It is understood, however, that other arrangements and ratios of the core portions 102A, 102B can be formed to accomplish different stick characteristics, weights, and strengths. For example, the core portions can be formed in different arrangements as shown in FIGS. 4 and 5, the description of which follows.

Figure 4:
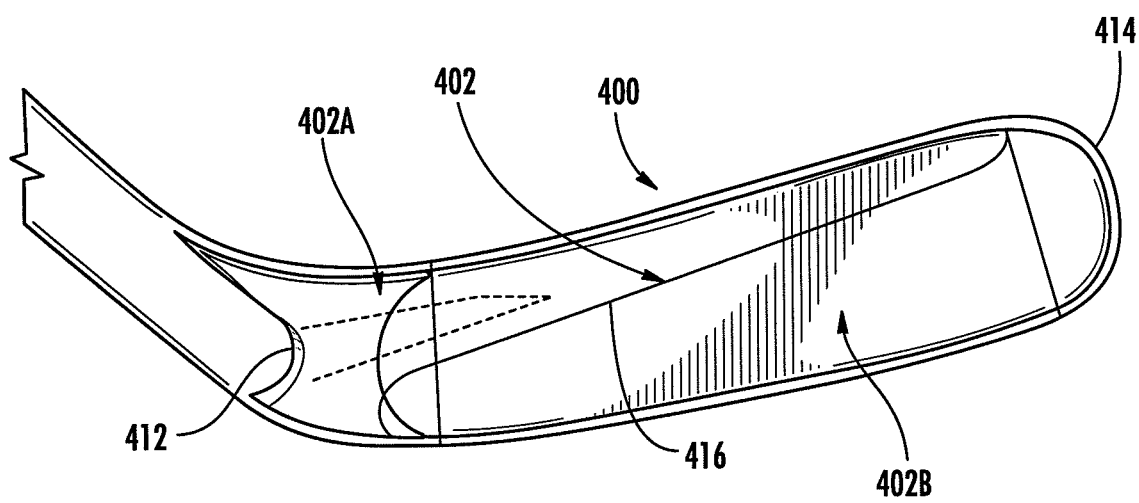
FIG. 4 is an isometric side view of an alternative embodiment of a core formed in the shape of a blade.

FIG. 4 shows an alternative arrangement. The blade 400 comprises a first core portion 402A and second core portion 402B, which makes up the core 402. The arrangement is similar to the arrangement in FIG. 1 with the exception that the first core portion 402A does not extend as far down the blade 400. In addition, the joint 416 between the first core portion 402A and the second core portion 402B forms a straighter line. The straight line joint 416 is advantageous as it may reduce the overall stress on the blade during use.

Figure 5:
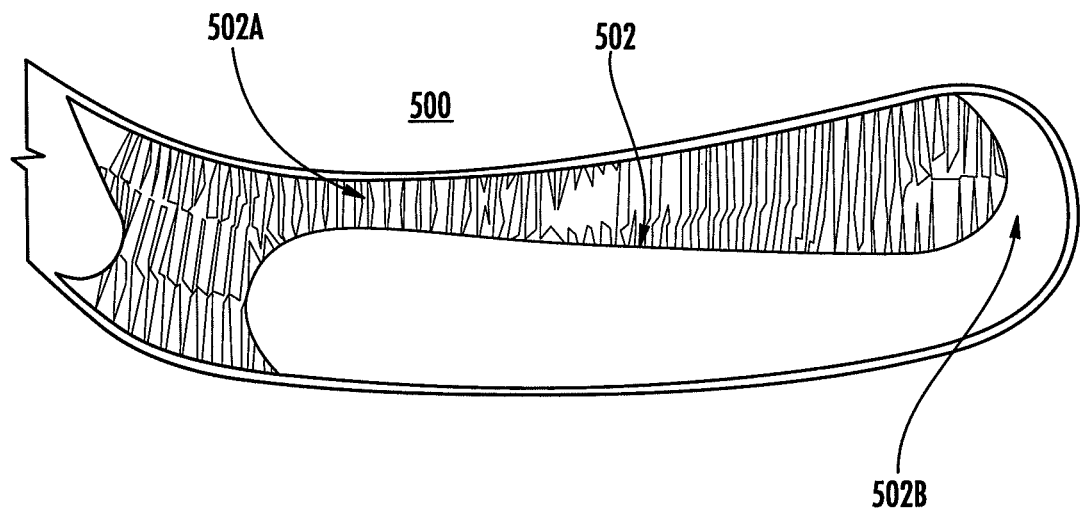
FIG. 5 is an isometric side view of another alternative embodiment of a core formed in the shape of a blade.

Another alternative arrangement is shown in FIG. 5. The embodiment shown in FIG. 5 is similar to the embodiments shown in FIGS. 1 and 4. However, the core 502 of the blade 500 has first and second core portions 502A and 502B that are formed with an oval-like shape at one end and a hook shape at the other end to receive the respective oval-like shaped ends. If one of the core portions 502A or 502B is formed with an epoxy, this arrangement and shaping of the first and second core portions 502A and 502B allows for the epoxy to flow and fill more evenly in the formation process.

The blade can be manufactured by forming a construct of two foams. The first core portion can be formed of a foam having a low density. The second core portion can be formed with an epoxy having a plurality of expanded polymeric shell microspheres. A suitable foam for the first core portion is polymethacrylimide (PMI) foam, which is manufactured under the name Rohacell. Additionally, a suitable low density PMI foam is RIMA (Resin Infusion Manufacturing Aid) foam. This type of foam is a high strength foam that can withstand the shear and impact forces that result when a hockey blade strikes a hockey puck. As shown in the various embodiments disclosed herein, the foam can be placed on various locations of the blade to create a blade with zones of varying density, such as the top or the toe of the blade to reduce weight.

The method of forming the two foams generally comprises sizing a foam core to form a first core portion and providing and preparing an epoxy mixture to form a second core portion. The first core portion and the second core portion consisting of the epoxy mixture are placed into a preform, and the preform is heated slightly so as to cause the epoxy mixture to flow into the shape of the preform and around the first core portion.

The first core portion is formed during a first preform process where the low density foam is laser cut into the desired 2-D profile from a flat sheet. Then, the cut flat piece of foam is placed into a first preform tool (not shown) and heated to approximately 208° C. to form the proper curve of the first core portion.

Figure 6:
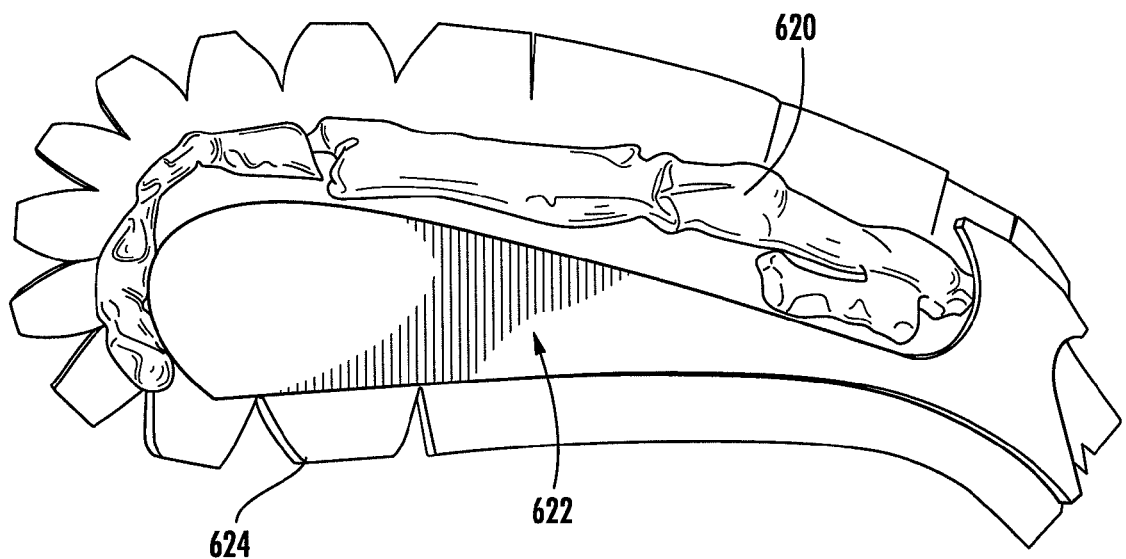
FIG. 6 depicts a manufacturing process of a blade formed in accordance with one aspect of the invention.

Next, as shown in FIG. 6, an epoxy material 620 is added adjacent the low density foam material 622 onto a carbon fiber layer 624. The carbon fiber layer 624 is then wrapped around the edges of the preform, and then a second carbon fiber layer (not shown) is added to the preform on the opposite side of the preform so as to cover the first core portion and the second core portion and overlaps the edges of the carbon fiber layer 624 and may have cut portions to provide for easier wrapping of the blade. The carbon fiber layers serve as a release film on the preform later in the process and aids the manufacturing process as the epoxy material is very sticky and difficult to work with. Additionally, the carbon fiber layers improve the overall structure of the blade when the epoxy begins to cross-link and bond.

Figure 7:
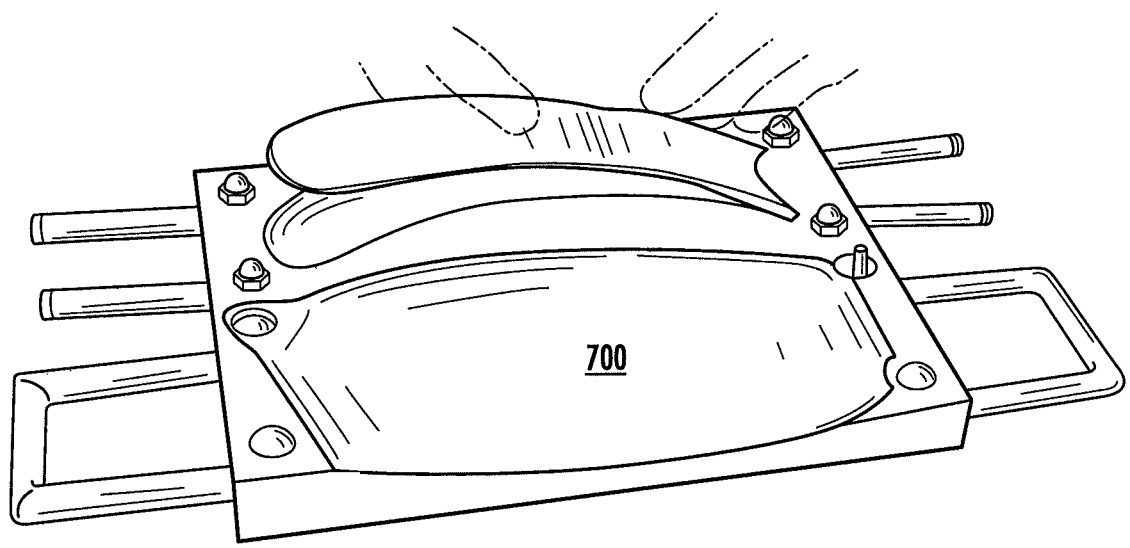
FIG. 7 illustrates an isometric view of a preform tool used in conjunction with one aspect of the invention.

The wrapped preform consisting of the low density foam material 622, the epoxy material 620, and the carbon fiber are then placed inside a second preform tool 700, which is depicted in FIG. 7. The low density foam material 622 and the epoxy material 620 respectively form the first core portion and the second core portion of the blade. In the preform tool 700, both the first core portion and the second core portion are preformed together to create a single dual-density but un-cured preform, and the two different materials of the first and second core portions are pushed together in the shape of a hockey stick blade core. This is accomplished by heating the first and second core portions under a low heat, approximately 20° C. to 40° C. The low heat causes the epoxy material to soften and allows it to flow into the shape of the second preform tool 700 and around the first core portion. At this point, the second core portion can comprise a mixture of expanded, partially expanded, and unexpanded microspheres. In particular, the entire second core portion is formed of an epoxy core material which may consist of a plurality of expanded, partially expanded, and unexpanded microspheres. Some of the microspheres are thus expanded by a heating process prior to placing the epoxy mixture into the mold. However, the unexpanded microspheres and partially expanded will not expand until the final molding process. The second core portion mixture can also include a chopped fiber and a curing agent. The carbon fiber layer allows the formed structure to be easily released from the second preform tool 700.

Figure 2:
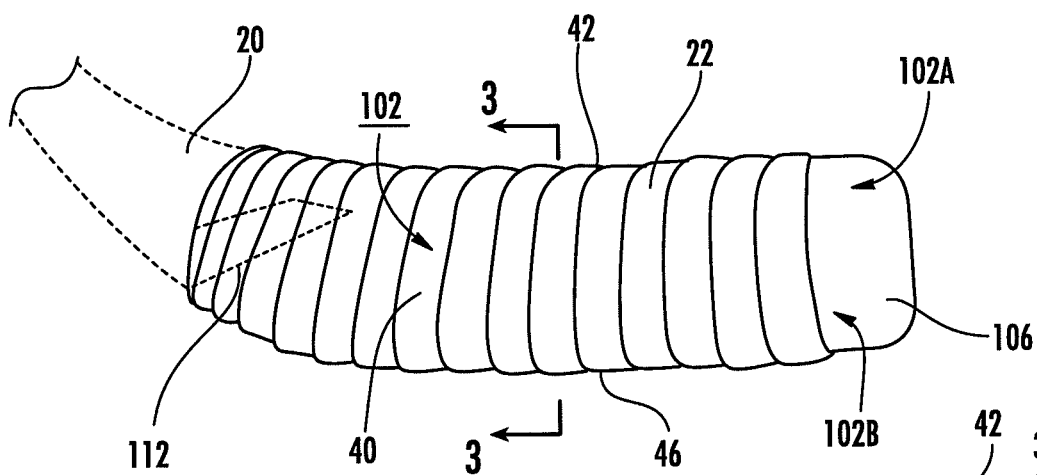
FIG. 2 generally illustrates an isometric side view of a core formed in the shape of a blade wrapped with tape.
Figure 3:
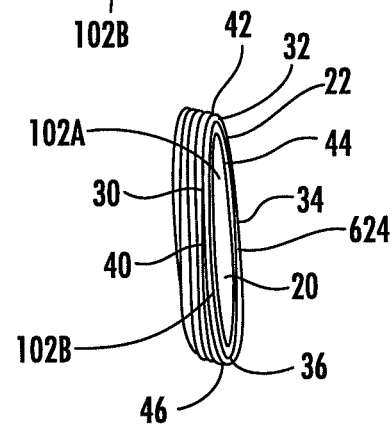
FIG. 3 is an isometric side view of the core with a cross sectional view taken along line 3-3 of FIG. 2.

The structure is then wrapped with carbon fiber tape 22. The carbon fiber tape 22 is preimpregnated with resin. As shown in FIGS. 2 and 3, the core 102 comprises a first core face and a second core face and a layer of resin preimpregnated tape 22 is wrapped continuously around at least the first core face and the second core face. FIG. 2 illustrates a side view of the core 102 formed in the shape of a blade and wrapped with tape 22. FIG. 3 is a cross-sectional view taken along line 3-3 of FIG. 3, which shows the tape 22 wrapped continuously around the core 102. The tape 22 is wrapped continuously around the first face surface 30, the first edge 32, the second face surface 34 and the second edge 36. This continuous wrapping of the preform 20 with the tape 22 results in a first wrapped face 40, a second wrapped face 44, a top wrapped edge 42 and a bottom wrapped edge 46. The fiber tape 22 can be preimpregnated with resin. The thickness of the tape 22 in FIG. 3 is exaggerated for purposes of more clearly illustrating the invention.

The first preform or core portion 102A and the second preform or core portion 102B can be wrapped with fiber tape to create a wrapped preform. The preform comprises a first face surface, a second face surface, a first edge surface and a second edge surface, and the fiber tape can be wrapped continuously around the first face surface, the first edge surface, the second face surface, and the second edge surface. As shown in FIG. 3, the preform has a first face surface 30, a first edge 32, a second face surface 34, and a second edge 36.

The tape may be wrapped in various configurations around the core, such as at a 30 or 45° angle to the longitudinal axis of the blade. A second layer of preimpregnated tape may be wrapped at a 90° angle to the tape.

The tape 22 extends around the entire core, to the end of the toe 106, but for purposes of more clearly illustrating aspects of the invention, the tape 22 is not shown extending to the end of the toe 106 of the core 102.

The use of tape wrapped continuously around the entire core 102, including the edges, is advantageous over a sandwich configuration, where the tape does not continuously extend of over the edges, for several reasons. A hockey blade must be very durable and capable of withstanding large forces from a variety of directions. For example, the hockey blade can encounter considerable forces, such as from striking a puck or the surface of the ice in multiple manners and angles. Thus, the core needs reinforcement in all directions. The wrap configuration results in a torsionally stiffer and stronger structure. The wrap configuration also is better able to withstand shear forces.

It is to be understood that the tape need not consist of a single unitary piece or sheet of material. For example, the tape can consist of a combination of multiple pieces or sheets that overlap.

After wrapping the core with a layer of fiber tape, a non-tacky veil can be placed on at least a portion of the first core portion 102A. The first core portion is then stitched with a polyester thread, and the thread extends between a first wrapped face and a second wrapped face.

A thread 112 in the pattern shown in FIG. 2, is stitched along the layer of preimpregnated tape on the first core portion. The thread can be formed of a high strength polyester, carbon fiber, or a carbon fiber preimpregnated with resin. A non adhesive scrim can be applied to the portions of the resin preimpregnated tape specifically along the first core portion 102A that extend along the first core face and the second core face to permit easier stitching of the blade. The non adhesive scrim can be formed from of one of woven fiberglass and polyester.

The stitching is accomplished with an industrial sewing machine (not shown). Placement of the wrapped structure with tape preimpregnated with resin in a sewing machine can cause the machine to stick or jam, and it can otherwise be difficult to operate the sewing machine with a sticky structure. The veil material described above is not sticky and thus makes it easier to stitch the wrapped core in the sewing machine.

The thread can extend from the first wrapped face 40 through the core 102 to the second wrapped face 44. The thread creates the effect of an I-beam between the first wrapped face 40 and the second wrapped face 44 and adds structural and shear strength and rigidity between the faces. If the veil (not shown) were used, it would be positioned along the wrapped faces 40, 44 covering the first core portion and the thread 112 would be positioned along the veil.

The thread 112 also pulls the tape toward the first wrapped face 40 and the second wrapped face 44 at the point where the thread 112 enters the core 102. The wrapped, stitched core is not flat in that the result of the thread 112 pulling the tape 40 toward the core 102 and various locations creates a somewhat bumpy or pillow effect on the surface of the first wrapped face 40 and the second wrapped face 44. It is understood that other stitching patterns and types are contemplated.

The wrapped preform is then placed in a mold, and the mold is then heated. The mold is heated to an appropriate temperature. In one embodiment, the mold is heated to 140° C. Upon heating, the epoxy softens, cross-links, and hardens, and the unexpanded or partially expanded microspheres expand in the epoxy mixture. A bond is formed between the first core portion foam core and the layer of resin preimpregnated tape. Also, the epoxy, microspheres, the other materials of the second core portion bond to each other and also bond to the carbon fiber tape in the mold. Moreover, the first core portion and the second core portion materials are bonded together by the cross-linking of the epoxy.

The mold is cooled and the formed blade is removed from the mold. The mold is then cooled and the formed structure is removed from the mold.

In one embodiment, "Expancell" microspheres are used to form the second core portion. In the formation of these microspheres, a drop of a hydrocarbon, liquid isobutene, is encapsulated in a gasproof, polymeric thermoplastic shell. When this microsphere is exposed to heat, the shell softens and the hydrocarbon inside the shell increases its pressure, expanding the shell. Before expansion, the diameter of the microsphere is typically 10-12 um and the density is 1000-1200 kg/m3. After expansion, the diameter of the microsphere is 40-50 um and the density decreases to 20-30 kg/m3.

The temperature at which expansion starts as well as the temperature at which the maximum expansion and the lowest density is obtained depends on a variety of factors including the rate of heating of the shells. At temperatures above the temperature at which the highest expansion is obtained the microspheres gradually collapse.

The microspheres are highly resilient. The expanded microspheres are easy to compress. Due to this resiliency, the microspheres can withstand cycles of loading/unloading without collapsing or breaking. This property is important for use in shock absorbent materials, such as a hockey blade.

Thermoplastic microspheres are distinct from glass microballoons. Glass microballoons are heavier than thermoplastic microballoons. Additionally, glass microballoons do not exhibit the same dampening properties as thermoplastic microballoons. For these reasons, although glass microballoons could be used, thermoplastic microspheres are preferred over glass microballoons in the manufacture of hockey stick blades, which must be lightweight, flexible and capable of withstanding considerable forces.

As a first step in one embodiment of the process, a group of expandable microspheres are heated until they expand from their original size to an expanded size. The expanded microspheres have a diameter of 60-120 um.

The expanded microspheres are then mixed with unexpanded microspheres. This combination of expanded and unexpanded microspheres is mixed with an epoxy material, such as Epon828. Other strengthening materials, such as aramid pulp, chopped fiber glass or chopped carbon fiber can also be added to the mixture. Carbon nanotubes can also be added enhance stiffness and shear strength. A curing agent is also added to the mixture. The final epoxy mixture 620 has the consistency of modeling clay, as shown in FIG. 6.

The mixture of the expanded microspheres, the unexpanded microspheres, the epoxy, the other strengthening materials and the curing agent is then formed in the shape of the second core portion.

The unexpanded microspheres are required to produce enough pressure on the outer walls of the structure. Without sufficient pressure during the molding process, the walls will be wrinkled and/or have large numbers of voids and/or other imperfections. The expanded microspheres increase the viscosity of the material, making a more stable preform during the kitting operation. Also, the expanded microspheres allow for a larger volume preform, which is closer to the final geometry of the part. This is advantageous because it allows less movement (and more precision) of the structural fibers during the molding process.

The combination of expanded and unexpanded (or partially expanded) is important because it provides a high viscosity material which produces enough pressure to compress/consolidate the carbon fibers walls around it.

In one embodiment, the core comprises the following materials (parts/weight):
Base epoxy (Epon 828): 100
Chopped fiber, e.g., Aramid Pulp 3091 (from Teijin): 2.5
Hardener (curing agent): 14.82
Expancel (pre-expanded) 092DET80d20: 2
Expancel (unexpanded) 051DU40: 2.5

In another embodiment, a group of expandable microspheres are heated and they partially expand from their original size to a larger size, but not to their full size. The partially expanded microspheres have a diameter of 60-90 um.

The partially expanded microspheres are then mixed with unexpanded microspheres. This combination of partially expanded and unexpanded microspheres is mixed with an epoxy material, such as Epon828. Other strengthening materials, such as aramid pulp, chopped fiber glass or chopped carbon fiber are also added to the mixture. Carbon nanotubes can also be added enhance stiffness and shear strength. A curing agent is also added to the mixture. The final epoxy mixture also has the consistency of modeling clay.

The mixture of the partially expanded microspheres, the unexpanded microspheres, the epoxy, the other strengthening materials and the curing agent is then formed in the shape of the second preform as described above.

In alternative embodiments, different combinations of core materials are used to create distinct recipes of core mixtures. The different mixtures can be used to create a blade with zones of varying density and stiffness. The bottom of the blade and the heel of the blade are typically subject to the most force and impact from striking the ice or a hockey puck. Core mixtures with higher density materials can be placed in the areas of the blade subject to greater forces and impacts, such as the bottom or heel, to create stronger blade regions.

The reader should understand that these specific examples are set forth merely to illustrate examples of the invention, and they should not be construed as limiting the invention. Many variations in the connection system may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A method comprising:
sizing a foam core to form an upper first core portion, the upper first core portion having a concave portion;
providing an unformed, malleable epoxy mixture to form a lower second core portion in a first unformed shape;
placing the first core portion and the second core portion into a preform having a preform shape;
heating the preform so as to cause the epoxy mixture forming the lower second core portion to flow and mold to form a corresponding convex portion in the concave portion of the first core portion to define a second formed shape different from the first unformed shape and wherein the first core portion is formed taller than the second core portion in a heel region and the second core portion is formed taller than the first core portion in a toe region;
wrapping the first core portion and the second core portion with fiber tape to create a wrapped preform;
stitching the first core portion with a thread, the thread extending between a first wrapped face and a second wrapped face of the wrapped preform;
placing the wrapped preform in a mold;
heating the mold to bond the first core portion and the second core portion;
cooling the mold; and
removing the formed structure from the mold.

2. The method according to claim 1 further comprising curving the first core portion prior to placing the first core portion into the preform.

3. The method according to claim 2 wherein the first core portion and the second core portion are wrapped with a layer carbon fiber.

4. The method according to claim 3 wherein the layer of carbon fiber comprises a first sheet and a second sheet and wherein the first core portion and the second core portion are placed on the first sheet and wherein the first sheet is wrapped around portions of the first core portion and the second core portion and wherein the second sheet is placed over the first core portion and the second core portion prior to placing the first core portion and the second core portion into the preform.

5. The method according to claim 1 wherein the second core portion mixture further comprises a plurality of expanded and partially expanded microspheres and wherein when the mold is heated the partially expanded microspheres fully expand.

6. The method according to claim 1 wherein the second core portion mixture further comprises a plurality of expanded and unexpanded microspheres and wherein when the mold is heated the unexpanded microspheres fully expand.

7. The method according to claim 1 further comprising the step of, after wrapping the foam core with a layer of fiber tape, placing a non-tacky veil on at least a portion of the first core portion.

8. The method of claim 1 wherein the concave portion of the first core portion and the convex portion of the second portion are located in the heel region.

9. The method of claim 8 wherein the first core portion forms a convex portion and wherein the second core portion when heated forms a corresponding concave portion around the convex portion of the first core portion.

10. The method of claim 9 wherein the convex portion of the first core portion and the concave portion of the second core portion are located in a toe region of the hockey blade construct.

11. The method of claim 10 wherein the thread is stitched in a U-shaped pattern in the heel region.

12. The method of claim 8 wherein the concave portion of the first core portion provides for the second core portion to flow and fill more evenly in the mold during heating the mold to bond the first core portion and the second core portion.

13. The method of claim 1 wherein the first core portion is stitched in the heel region.

14. A method comprising:
sizing a foam core to form a first core portion defining a first core portion shape;
providing a malleable epoxy mixture to form a second core portion in a first unformed shape;
placing the first core portion and the second core portion into a preform having a preform shape;
heating the preform so as to cause the epoxy mixture forming the lower second core portion to form into a formed shape different from the unformed shape and corresponding to the first core portion shape;
wrapping the first core portion and the second core portion with fiber tape to create a wrapped preform;
placing the wrapped preform in a mold;
heating the mold to bond the first core portion and the second core portion;
cooling the mold; and
removing the formed structure from the mold.

15. The method of claim 14 wherein the first core portion forms a concave portion and the second core portion when heated forms a corresponding convex portion in the concave portion of the first core portion to form a hockey blade construct and wherein the concave portion of the first core portion and the convex portion of the second portion are located in the heel region.

16. The method of claim 15 wherein the first core portion forms a convex portion and wherein the second core portion when heated forms a corresponding concave portion around the convex portion of the first core portion.

17. The method of claim 16 wherein the convex portion of the first core portion and the concave portion of the second core portion are located in a toe region of the hockey blade construct.

18. The method of claim 15 wherein the concave portion of the first core portion provides for the second core portion to flow and fill more evenly in the mold during heating the mold to bond the first core portion and the second core portion.

* * * * *